United States Patent [19]

Taylor

[11] 4,300,819

[45] Nov. 17, 1981

[54] EYEGLASSES FOR AIDING COLOR BLIND VIEWERS

[76] Inventor: Donald E. Taylor, Rte. 2, Box 144, Mundelein, Ill. 60060

[21] Appl. No.: 91,964

[22] Filed: Nov. 7, 1979

[51] Int. Cl.³ ........................... G02C 7/02; C02C 7/10
[52] U.S. Cl. ...................................... 351/41; 351/163
[58] Field of Search .............................. 351/163–165, 351/41

[56] References Cited

U.S. PATENT DOCUMENTS

| | | | |
|---|---|---|---|
| 2,409,356 | 10/1946 | Hutchings | 351/165 |
| 2,675,740 | 4/1954 | Barkley | 351/165 X |
| 3,586,423 | 6/1971 | Zeltzer | 351/39 |
| 3,701,590 | 10/1972 | Zeltzer | 351/39 |
| 3,877,797 | 4/1975 | Thornton, Jr. | 351/163 |

FOREIGN PATENT DOCUMENTS 1055677  2/1954  France ............................... 351/163

OTHER PUBLICATIONS

20/20; 20/20 Abstracts; Sep./Oct., 1974; p. 29.

*Primary Examiner*—John K. Corbin
*Assistant Examiner*—Scott J. Sugarman
*Attorney, Agent, or Firm*—Robert E. O'Neill

[57] ABSTRACT

Improved eyeglasses for use by color blind individuals or viewers. The eyeglasses are constructed to have two lenses, one of which is clear and the other of which is colored. Each lens is formed to have a reflective or mirror surface as viewed from the front of the eyeglasses. When worn by a color blind viewer, the combination of lenses improves the color blind viewer's ability to discriminate between different colored objects while the reflective or mirror surfaces cause the lenses to appear to be identical to other persons or viewers.

7 Claims, No Drawings

EYEGLASSES FOR AIDING COLOR BLIND VIEWERS

BACKGROUND OF THE INVENTION

The present invention relates to optical devices for use by color blind viewers and more particularly, to eyeglasses which improve the ability of a color blind viewer to discriminate between different colored objects.

A large proportion of the population suffers from some form of color blindness which reduces eye discrimination of different colored objects. For example, a common form of color blindness is known as red/green color blindness wherein the eyes of a viewer cannot distinguish between the colors red and green. Thus, if a red/green color blind viewer were to look at an apple tree, any red apples would not stand out from the otherwise green leaves of the tree and the primary way that the apples could be distinguished would be by viewer recognition of the apple outline. Obviously, this condition causes increased viewer problems in object discrimination and even more problems when it is necessary to distinguish between red and green under circumstances where other characteristics (e.g. shape, outline, etc.) are not distinguishable.

In the prior art, optical filtering devices have been used to aid in the color discrimination between different colored objects. In U.S. Pat. No. 3,877,797, for example, optical filters are disclosed which alter the illuminating radiations of a light source or alter the object reflected radiations received by a viewer's eye in order to enhance color discrimination between objects of different colors. This particular patent achieves such results by forming an optical filter (which can be the lens structure of eyeglasses or spectacles) to remove two selected bands of radiation having variable bandwidth.

While the above technique and others may provide certain advantages in color discrimination, there is still a need for devices which aid color discrimination for color blind viewers. Accordingly, the present invention has been developed to provide a simple and inexpensive device for aiding object discrimination and more particularly, to provide eyeglasses which aid in color discrimination, but which appear to be conventionally constructed.

SUMMARY OF THE INVENTION

There is provided an improved pair of eyeglasses for use by color blind viewers. The eyeglasses are formed to have two lenses which cooperate to aid in the discrimination of objects of different colors. In the preferred embodiment, each lens is constructed using conventional elements except that one lens is formed with a clear element and the other lens with a colored element. Each lens is additionally coated or otherwise formed to have a reflective or mirror-like surface so that when viewed by persons other than the viewer wearing the eyeglasses, both lenses appear to be the same. The lenses are preferably positioned so that when the eyeglasses are worn by a color blind viewer having a dominant eye, the non-dominant eye receives light through the colored lens and the dominant eye receives light through the clear lens. The combination improves color discrimination for the color blind viewer without it being evident to other observers that different colored lenses are used in the construction of the eyeglasses.

It is a feature of the present invention to provide eyeglasses for use by color blind viewers which are simple and inexpensive in construction.

It is another feature of the invention to provide eyeglasses with different colored lens structures to enable different colors to be distinguished by a color blind viewer.

It is a further feature of the invention to provide eyeglasses with lens structures which appear identical to observers but which aid in color discrimination for color blind viewers.

These and other advantages and novel features of the invention will become apparent from the following detailed description.

DETAILED DESCRIPTION OF A PREFERRED EMBODIMENT

Generally, the invention may include any one of a variety of conventional eyeglass configurations. By way of example, the eyeglass structure may include any eyeglass frame having two spaced apart frame portions coupled by an intermediate member and an arm coupled to and extending from an outside edge of each frame portion. Conventionally, each arm member may be rigidly affixed or hinged to one frame portion, at one end, to allow folding of the arms, while the other end is fit and formed to be retained over a portion of the ear of a viewer in a known manner. The frame portions are generally oriented and configured so that a lens or lens structure (which includes a lens element) is held by each frame portion to position one lens in front of each eye when the eyeglasses are worn by a viewer. The term lens, when used in this disclosure, is meant to include that part of the eyeglass structure through which it is intended that light pass to be received by the eye of a viewer. The lens may be formed as a homogeneous or composite member and may be coupled separately to or integral with the eyeglass frame. The eyeglasses may include additional conventional structures attached to the frame to allow resting and positioning of the frame on the nose of the viewer, as well as a variety of other cosmetic configurations which are conventional and unnecessary for an understanding of the present invention.

Normally, a conventional pair of eyeglasses will contain prescription lenses through which light radiation will pass before being received by the eyes of the viewer. In such instances, the lens will cause focusing or other modification of the light radiation passing to the eye through the lens in order to correct for a slight problem of the viewer.

In other instances, the eyeglasses may be formed to act solely as a protective device. In those instances, the lenses are designed to protect the eyes from the entry of foreign material or specific wavelength and intensities of light (e.g. sunglasses, grinding goggles, etc.) rather than to correct for particular eye problems.

In still other instances, eyeglasses are constructed solely for cosmetic appearance and contain lenses which do not perform any particular function. In those instances, the emphasis is placed on design and configuration of a frame and lens structure which is attractive on the viewer.

In accordance with the present invention, eyeglasses are disclosed which are modified to aid a color blind viewer in discrimination between different colored objects, but which are compatible with the uses noted above. More specifically, the eyeglasses of the present invention are constructed to have one lens which includes a clear lens element that passes substantially all of the visable wavelengths of light radiation; and a second lens having a colored lens element which modifies the visable wavelengths of light radiation passing therethrough. Each lens further includes a means for forming a reflective or mirror surface so that when worn by a color blind viewer, there does not appear to be any difference in the color of the lenses to other viewers.

In its simplest form, the lens with the clear lens element is constructed using a conventional homogeneous clear glass or plastic material as the lens element and coating an entire surface of the clear element with a material to form the reflective or mirror surface. The other lens is constructed by using a homogeneous colored glass or plastic material as the lens element and also coating an entire surface with the same material to form the reflective or mirror surface. For viewers who have red/green color blindness, the colored lens is selected to be red or a shade of red. The lenses are then located in the eyeglasses so that the red lens is preferably positioned in front of the non-dominant eye of the viewer.

The formation of a reflective or mirror surface in the lens may be accomplished by one of a variety of conventional techniques. For example, the surface may be formed by coating as disclosed above or by any other technique or structure which causes light to be reflected from the front of the lens so that to an observer, looking at the eyeglasses worn by a color blind viewer, both lens structures and elements will appear to be of similar construction and the differences in color will not be readily discernable. Such reflective or mirror surfaces are presently formed in the lens elements of certain types of conventional sunglasses and may be similarly employed in the eyeglasses of the present invention.

In use, the above described eyeglasses allow a color blind viewer to more easily discriminate between objects of different colors. In particular, where one red lens is employed and the eyeglasses are worn by a red/green color blind viewer, the combination of lenses will cause a modification of the viewer's perception so as to enable him to distinguish different colored objects. When so worn, however, the eyeglasses will appear to be conventional and other observers will be unable to discern that the eyeglasses are specially made for color-blindness or that they employ lens elements of different colors. In addition, since the eyeglasses are made using only conventional elements, they are simple and inexpensive to manufacture.

While the invention has been described with particular reference to the formation of each lens as a conventional lens element and mirror coating, it is apparent that other configurations could be employed in accordance with the teachings of the present invention. By way of example, in lieu of the lens element being colored, a separate colored member or coating could be used to provide the coloring of the lens element. Obviously, many other modifications and variations of the present invention are possible in light of the above teachings. It is therefore to be understood that within the scope of the appended claims, the invention may be practiced otherwise than as specifically described.

I claim:

1. In a pair of eyeglasses having two lenses retained in spaced apart relationship so that when worn by a viewer, one lens is located in front of each eye of the viewer for viewing therethrough, the improvement comprising:

one of said lens consisting essentially of a clear lens element of a clear homogeneous material for passing light therethrough and a means for forming a mirror surface over the clear lens element; and the other of said lenses consisting essentially of a colored lens element of a homogeneous colored material for passing light therethrough and a means for forming a mirror surface over the colored lens element.

2. The eyeglasses of claim 1 wherein said colored lens element is red.

3. The eyeglasses of claim 1 wherein said means for forming a mirror surface comprises a coating over the surface of each lens element forming a mirror surface.

4. In the combination of a pair of eyeglasses worn by a color blind viewer so that one lens is located in front of each eye for viewing therethrough, the improvement in said eyeglasses comprising:

one of said lenses consisting essentially of a clear lens element of a clear homogeneous material for passing light therethrough and a means for forming a mirror surface over the clear lens element; and the other of said lenses consisting essentially of a colored lens element of a homogeneous colored material for passing light therethrough and a means for forming a mirror surface over the colored lens element.

5. The combination of claim 4 wherein the color blind viewer has a dominant eye and a non-dominant eye and the colored lens element is located so that it is in front of the non-dominant eye for viewing therethrough.

6. The combination of claim 4 wherein the colored lens element is red.

7. The combination of claim 4 wherein said means for forming a mirror surface comprises a coating over the surface of each lens forming the mirror surface.

* * * * *